United States Patent
Ballantyne et al.

(10) Patent No.: US 7,786,762 B2
(45) Date of Patent: Aug. 31, 2010

(54) GENERIC BUFFER CIRCUITS AND METHODS FOR OUT OF BAND SIGNALING

(75) Inventors: Richard S. Ballantyne, Stittsville (CA); Catalin Baetoniu, Toronto (CA); Mark Paluszkiewicz, Schaumburg, IL (US); Henry E. Styles, Menlo Park, CA (US); Ralph D. Wittig, Menlo Park, CA (US)

(73) Assignee: Xilinx, Inc., San Jose, CA (US)

( * ) Notice: Subject to any disclaimer, the term of this patent is extended or adjusted under 35 U.S.C. 154(b) by 45 days.

(21) Appl. No.: 12/357,369

(22) Filed: Jan. 21, 2009

(65) Prior Publication Data

US 2010/0183081 A1 Jul. 22, 2010

(51) Int. Cl.
*H03K 19/0175* (2006.01)

(52) U.S. Cl. .................... 326/82; 326/62; 326/37; 327/407

(58) Field of Classification Search .............. 326/37, 326/62, 82; 375/257; 327/108, 333, 407
See application file for complete search history.

(56) References Cited

U.S. PATENT DOCUMENTS

| | | | |
|---|---|---|---|
| 5,325,355 A | 6/1994 | Oprescu et al. | |
| 5,914,616 A | 6/1999 | Young et al. | |
| 6,448,806 B1 * | 9/2002 | Roth | 326/16 |
| 6,466,049 B1 | 10/2002 | Diba et al. | |
| 2003/0158991 A1 | 8/2003 | Deyring et al. | |

FOREIGN PATENT DOCUMENTS

EP 1 132 827 A2 9/2001
WO WO 2006/054226 A2 5/2006

OTHER PUBLICATIONS

"Virtex-4 FPGA Users Guide"; User Guide 70 v2.5, Jun. 17, 2008, 406 pages, Xilinx, Inc., 2100 Logic Drive, San Jose, CA 95124.

* cited by examiner

*Primary Examiner*—Daniel D Chang
(74) *Attorney, Agent, or Firm*—Slater & Matsil, LLP

(57) ABSTRACT

Circuits and methods for a differential signal interface for coupling differential signals at a first frequency on a pair of opposite polarity signals to a multiple gigabit transceiver with generic buffers for receiving, transmitting or transceiving out of band signals at a second frequency lower than the first frequency are disclosed. Termination networks are provided coupling generic input buffers to respective ones of the pair of opposite polarity signals for receiving out of band signals where the opposite polarity signals are placed at voltages so that the differential voltage between them is below a threshold voltage. Methods for providing generic buffers with multiple gigabit transceivers for receiving and transmitting out of band signals on a differential signal interface are provided. Out of band signals are received when the out of band signaling protocol is not known.

20 Claims, 13 Drawing Sheets

GENERIC BUFFER CIRCUITS AND METHODS FOR OUT OF BAND SIGNALING

FIELD OF THE INVENTION

Embodiments of the present invention relate to circuitry and methods for the reception and transmittal of out of band signals over a high speed differential signaling interface. In particular, embodiments of the invention relate to circuits and methods directed to receiving and transmitting out of band signals using generic buffer circuitry.

BACKGROUND

In providing signals to and receiving signals from systems and integrated circuits, techniques have been developed to increase the signaling or data rate. In one known approach, serial data is transmitted over a high frequency serial differential signal interface. Differential signaling transmits a pair of normally opposite polarity signals that are separated by a relatively small differential voltage. The differential signal receiver senses the differential voltage and can recover clock and data signals from these received inputs. Transmitters can similarly send differential signals corresponding to data signals on interface. Because the differential voltage transmitted on this interface requires less than a full logic level voltage signal swing to transition from a high to a low signal level, higher speed switching may be achieved. These high frequency signals may be transmitted at data rates of up to 10 Gigabits per second (Gps). As technology advances, these data rates are continuously increasing. Further, by using groups of these multi-gigabit differential signals, very high data transmission rates may be achieved.

FIG. 1A depicts a voltage waveform of typical signals on a prior art multi-gigabit signaling interface. In FIG. 1A, the two opposing polarity signals are designated TX+ and TX−. The differential voltage, which may be for example around 2 Volts, represents signal data. When the differential voltage between the two signals is positive, it can represent one data value, for example, a logical "1". When the differential voltage between the two voltages is negative, the signal can represent another data value, for example, a logical "0". These logical value assignments are arbitrary and may be reversed, as is known in the art.

In certain signaling standards that utilize multi-Gigabit transceivers (MGTs), out-of-band (OOB) signals are used to communicate messages that are of types other than for transmitting and receiving high speed data. For MGT interfaces, an OOB signal is a signal which is sent with both of the normally opposite polarity differential signal lines at the same voltage. As non-limiting examples, OOB signals may be used to initialize a device at power up or reset, set certain parameters in the MGT buffers or otherwise set or read other parameters in the device, perform testing or configuration operations, and the like.

During OOB signaling, the two normally opposing differential signal lines are placed at the same potential, that is, the differential voltage is held below a low voltage threshold and approaches zero. The absence of a difference in these two voltages makes detection of the presence of an OOB signal fairly straightforward and robust.

FIG. 1B depicts an OOB signal on a multi-gigabit signal interface. As shown in the figure, when the two normally opposite polarity signals TX+ and TX− take approximately the same voltage value, that is when the differential voltage is less than a threshold voltage, the presence of an OOB signal can be detected. The OOB signals are typically transmitted at relatively low frequency and may provide, for example, initialization, observation, test and reset type functionality to the system. By using the OOB signals, additional input, output or input/output capability is provided to the device or circuit without the need for providing or using any additional pins or terminals.

Presently, new differential signaling standards based on MGTs with OOB signaling are being developed. As a non-limiting example, the bus standard known as Intel QuickPath interface presently in development includes a MGT interface using an OOB signaling protocol. The details of this OOB protocol are not yet known, so existing MGT transceiver buffers with OOB circuitry cannot support signaling using these as yet undefined OOB protocol signals. In addition other OOB signaling protocols that are defined in the future cannot be received by the prior art MGT transceivers. This characteristic of the prior art MGT transceivers necessitates a circuit redesign to receive these developing OOB protocols.

A continuing need thus exists for transceiver circuitry and methods to provide circuitry for receiving, transmitting and/or transceiving differential signals on a multi-gigabit signal interface that is further capable of receiving, transmitting or transceiving OOB signals on the multi-gigabit signal interface. The OOB signals may include OOB signal protocols that are not yet defined.

SUMMARY

These and other problems are generally solved or circumvented, and technical advantages are generally achieved, by advantageous embodiments of the present invention which include methods and apparatuses for receiving, transmitting and transceiving differential MGT signals on a differential signaling interface and using general purpose buffers to receive and transmit OOB signals on the same interface.

In an exemplary embodiment, an apparatus is provided including a differential signal interface for coupling a differential signal at a first frequency on a pair of opposite polarity signals; a differential signal receiver coupled to the differential signal interface and outputting received data signals; a first general purpose input buffer for receiving an out of band signal at a second frequency lower than the first frequency, coupled to one of the pair of opposite polarity signals, and having a first out of band signal output; a second general purpose input buffer for receiving the out of band signal at the second frequency, coupled to the other one of the pair of opposite polarity signals, and having a second out of band signal output. The OOB signal is received on the differential signal interface having the same voltage level on both of the pair of opposite polarity signals. In another exemplary embodiment, the above described circuit includes transmission networks for coupling the differential receiver circuit to the opposite polarity differential signals, the transmission networks further having terminals for coupling the generic input buffers to the respective one of the differential signals.

In another exemplary embodiment, a configurable integrated circuit is provided with user defined functionality and including multi-gigabit receiver circuits. The multi-gigabit receiver circuits are coupled to receive differential signals at a first frequency on a pair of opposite polarity signals; the embodiment further includes a first general purpose input buffer for receiving out of band signals at a second frequency lower than the first frequency, coupled to one of the pair of opposite polarity signals, and having a first out of band signal output; a second general purpose input buffer for receiving out of band signals at the second frequency, coupled to the other one of the pair of opposite polarity signals, and having a second out of band signal output. The out of band signals are received on the differential signal interface having the same voltage level on both of the pair of opposite polarity signals. In another exemplary embodiment, the circuit includes transmission networks for coupling the multi-gigabit receiver circuit to the opposite polarity differential signals, the transmission networks further having terminals for coupling the generic input buffers to the respective differential signals. In another exemplary embodiment, the above described circuit further includes general purpose output buffers for transmitting out of band signals on the opposite polarity differential signals.

In an exemplary method embodiment, the method includes receiving a pair of opposite polarity differential signals at a first frequency on a multi-gigabit differential signal interface; providing a first general purpose input buffer coupled to one of the pair of opposite polarity differential signals for receiving OOB signals at a second frequency lower than the first frequency, and having received out of band signal output; and providing a second general purpose input buffer coupled to the other one of the pair of opposite polarity differential signals for receiving out of band signals at a second frequency lower than the first frequency, and having received out of band signal output; wherein receiving the out of band signals includes receiving signals on the opposite polarity differential signals that are at the same voltage level. In a further method embodiment, the above recited method is performed and further includes providing transmission networks for coupling a differential receiver circuit to the opposite polarity differential signals, the transmission networks further having terminals for coupling the generic input buffers to the respective ones of the differential signals.

The foregoing has outlined rather broadly the features and technical advantages of certain exemplary embodiments of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention.

BRIEF DESCRIPTION OF THE DRAWINGS

For a more complete understanding of the invention, and the advantages thereof, reference is now made to the following descriptions taken in conjunction with the accompanying drawing, in which.

DETAILED DESCRIPTION

Example communications standards that presently utilize OOB signaling with MGT interfaces include the serial ATA (SATA), XAUI, and PCI Express standards. Certain MGT transceiver circuits including circuitry for receiving these prior art OOB signaling protocols have been designed and are supplied by commercial integrated circuit manufacturers. For example, using the Virtex family of field programmable gate arrays (FPGAs) available from Xilinx Inc., the assignee of the present application, input output buffers available include selectable I/O buffers designated "RocketIOs" which have the ability to detect and receive some of these known protocol OOB signals. A document entitled "Virtex-5 FPGA RocketIO GTP Transceiver Users Guide", v1.6, published Feb. 11, 2008, available from Xilinx, Inc., 2100 Logic Drive, San Jose, Calif. 95124, and hereby incorporated by reference herein in its entirety, describes these MGT transceivers. For known OOB protocols, a signal indicating the OOB signaling may be detected on the interface. These protocols may be referred to as OOB "beacons".

Figure 1A:
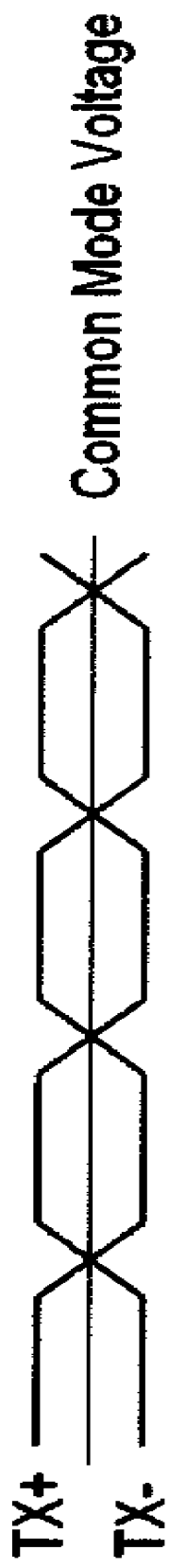
FIG. 1A illustrates a time-voltage waveform for a differential signal using two opposite polarity signals to transmit data.
Figure 1B:
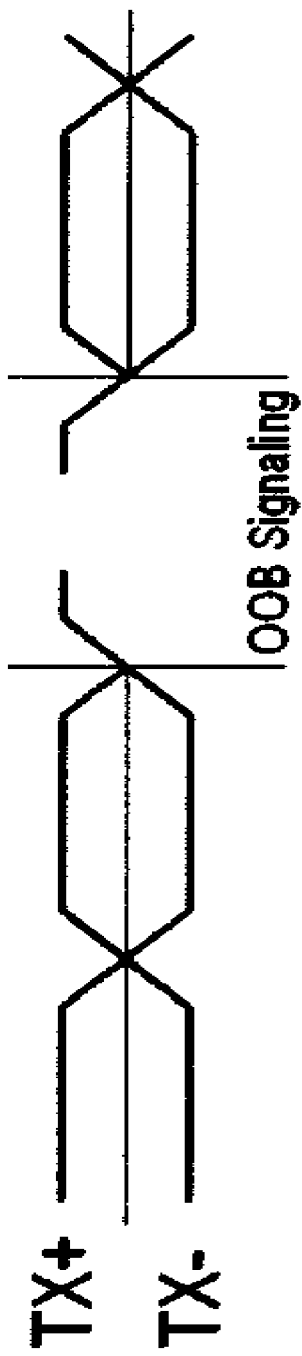
FIG. 1B illustrates an out of band signaling period depicted on the time-voltage waveform of FIG. 1B.
Figure 2:
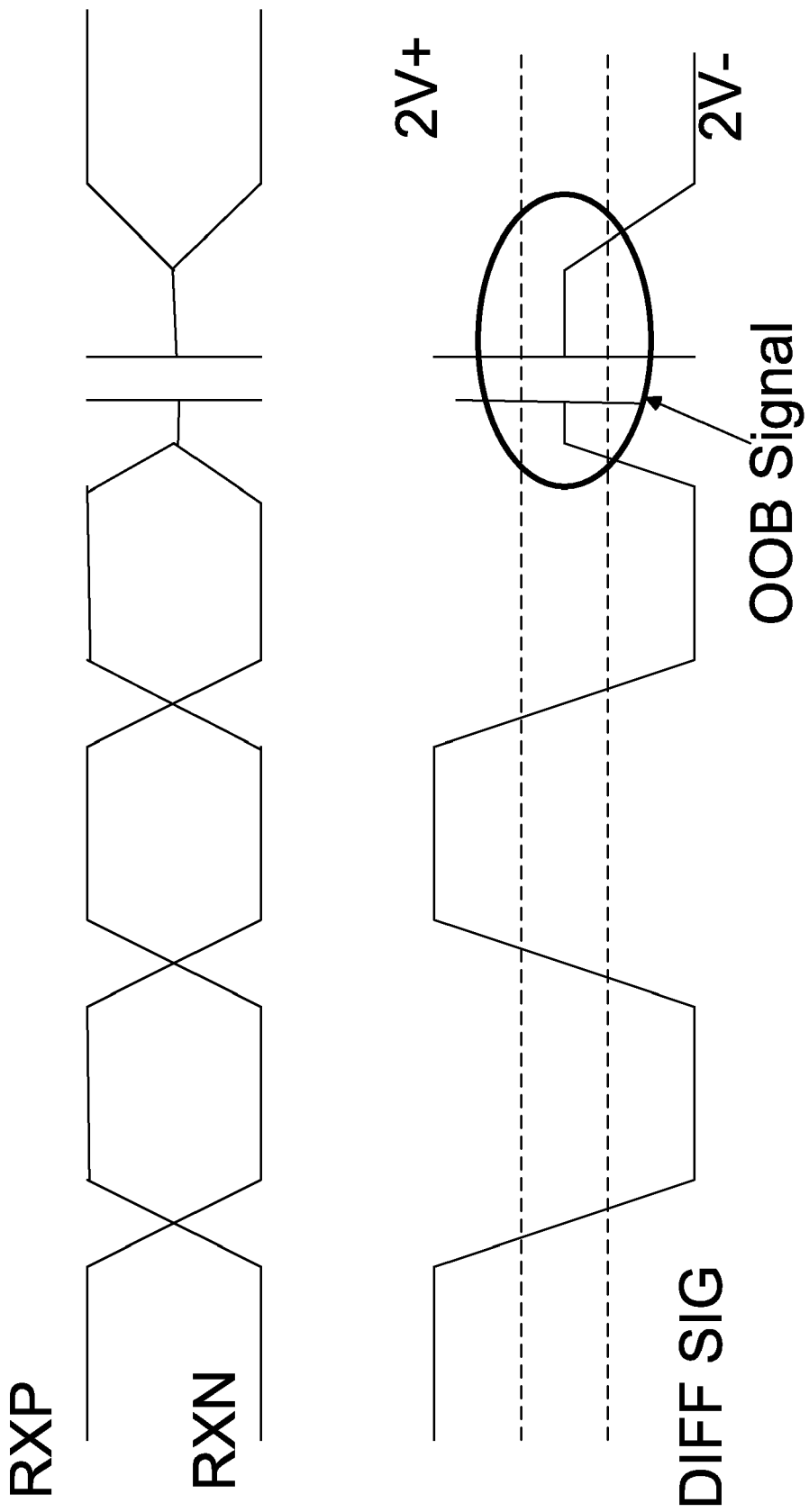
FIG. 2 illustrates received signals from a differential signaling interface where an out of band signal is transmitted.

FIG. 2 depicts the received differential data signal for a series of waveforms on received MGT signals RXP and RXN. As the voltages on RXP and RXN transition so that one or the other is at a higher voltage than the corresponding opposing polarity signal, the received differential voltage may be positive or negative, as shown. In this representative example, the differential voltage ranges from a +2V to a -2V level. These voltage levels may be varied. The naming conventions "P" and "N" signify the "positive" and "negative" polarity signals, but these are arbitrary names and may be reversed.

As further shown in the figure, when the two differential signals RXP and RXN take the same or approximately the same voltage level for a period of time, a differential signal DIFF SIG that is less than a threshold voltage occurs. When this is detected, it indicates an OOB signal. The OOB signals will typically switch at a frequency that is orders of magnitude lower than the frequency of the multi-gigabit differential signals, as indicated by the breaking bar symbols in the figure. The OOB signal is much longer (in time) than the differential signals. The presence of a zero or very low differential voltage below a threshold and the lower frequency are characteristics of the OOB signal that allow it to be distinguished from the MGT differential signals.

Figure 3:
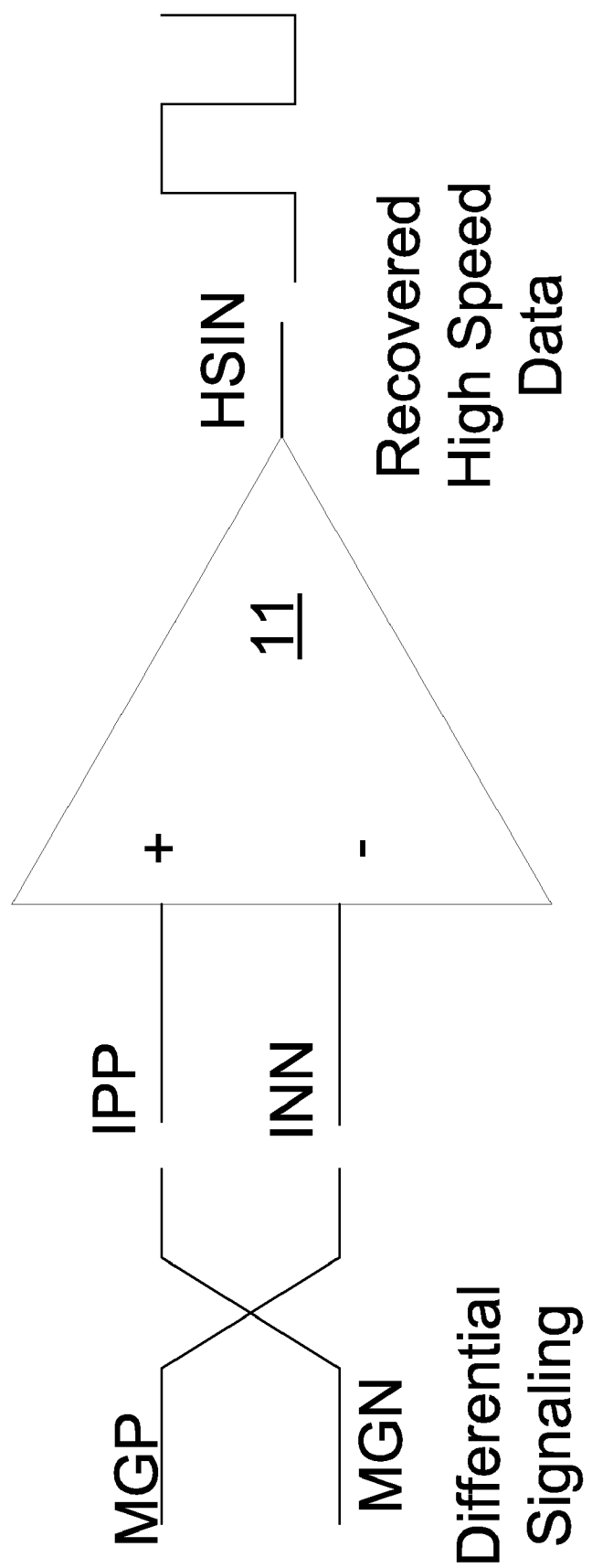
FIG. 3 illustrates a prior art receiver for receiving high frequency differential signals and outputting recovered data.

FIG. 3 depicts a simple schematic for a prior art MGT receiver 11. The buffer is shown with differential inputs labeled + and −, and the output signal labeled HSIN which indicates a high or a low differential output voltage. This differential input buffer 11 is designed to receive the high frequency MGT signals and does not recognize the OOB signals, because the differential voltage when OOB signals are present is too low.

The MGT receiver 11 of FIG. 3 could be provided as a discrete component, for example, for use on a circuit board. More typically, the buffer would be placed as an input receiver circuit for MGT signals within an integrated circuit. Multiple instances of the MGT buffer 11 may be arranged together to increase the data throughput available.

Of increasing commercial importance are user definable integrated circuits that may include input, output and input/output circuitry that receive and transmit multi-gigabit differential signals. Programmable logic devices (PLDs) are a type of user definable integrated circuit. In one form, the PLDs may be Complex PLDs (CPLDs). In CPLDs, configuration data is typically stored on-chip in non-volatile memory. In some CPLDs, configuration data is stored on-chip in non-volatile memory, then downloaded to volatile memory as part of an initial configuration sequence.

Further information on CPLDs can be found, for example, in U.S. Pat. No. 6,466,049 B1 by Diba et al., issued Oct. 15, 2002, which is hereby incorporated herein by reference in its entirety.

Another type of PLD of increasing commercial importance is Field Programmable Gate Array (FPGA) circuits. In an FPGA, the integrated circuit device is manufactured to a complete state by a semiconductor manufacturing process. After manufacture, however, the actual functionality of the device is programmable (in the field, as the name suggests) so that the final function of the device is determined by, and programmed by, a user. The configuration of the FPGA may also be revised by reprogramming the device.

FPGAs typically include an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

FPGAs offer a rapid method for designing and producing an integrated circuit for use either as an end product or as a means to prove a proposed integrated circuit design prior to moving to more expensive and timing consuming methods of integrated circuit manufacture. Because an FPGA may be reprogrammed, the use of an FPGA also provides some ability to "future-proof" the design of the final product by allowing the integrated circuit functionality to be modified. This is important to maintain the usefulness of the device when interfaces or other requirements change.

Figure 4:
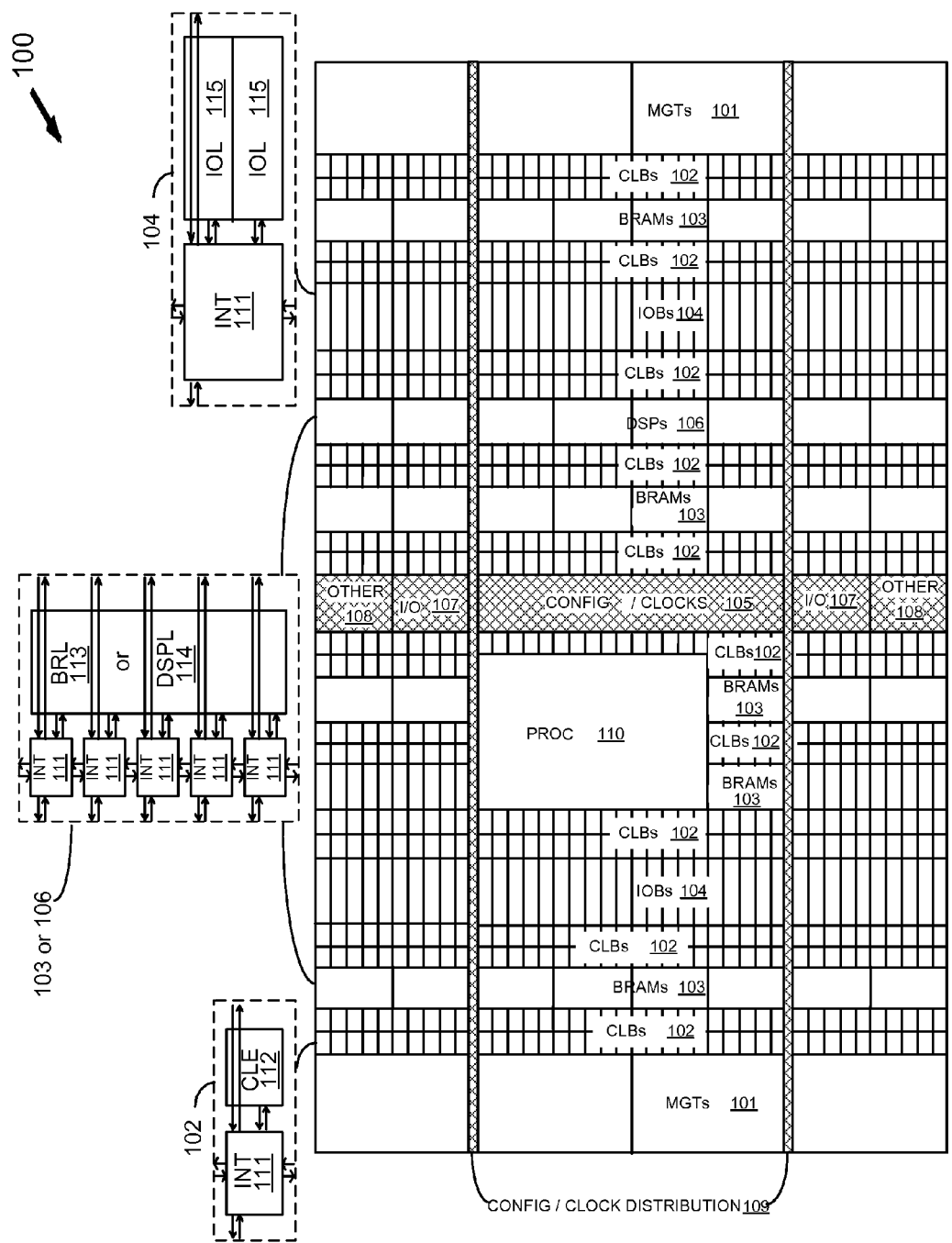
FIG. 4 illustrates an FPGA device including input/output circuits for receiving and transmitting multi-gigabit signals on a differential signaling interface.

A non-limiting example of a commercially available prior art FPGA is depicted in a block diagram FIG. 4. This Virtex-4 FPGA device is available from Xilinx, Inc., and is described in detail in the Xilinx datasheet entitled "Virtex-4 FPGA Users Guide" published Jun. 17, 2008, and available from Xilinx, Inc., 2100 Logic Drive, San Jose, Calif. 95124; which document is incorporated herein by reference in its entirety. Young et al. further describes the interconnect structure of the Virtex FPGA in U.S. Pat. No. 5,914,616, issued Jun. 22, 1999 and entitled "FPGA Repeatable Interconnect Structure with Hierarchical Interconnect Lines", which is incorporated herein by reference in its entirety.

FIG. 4 illustrates FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 4.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 4) is used for configuration, clock, and other control logic. Horizontal areas 109 extending from this column are used to distribute the clocks and configuration signals across the breadth of the FPGA.

Note that FIG. 4 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

In order to properly receive OOB signals on a multi-gigabit signaling interface using the known MGTs, the OOB protocol to be received must be known, so that the correct OOB beacon logic and decoding circuitry is included in the multi-gigabit transceiver. Thus, in order to provide a finished integrated circuit that will correctly receive the OOB signals, the user must know the OOB signaling protocol that is expected at the pins of the integrated circuit device and must enable the appropriate built-in transceiver function in configuring the MGT I/O transceiver.

Figure 5:
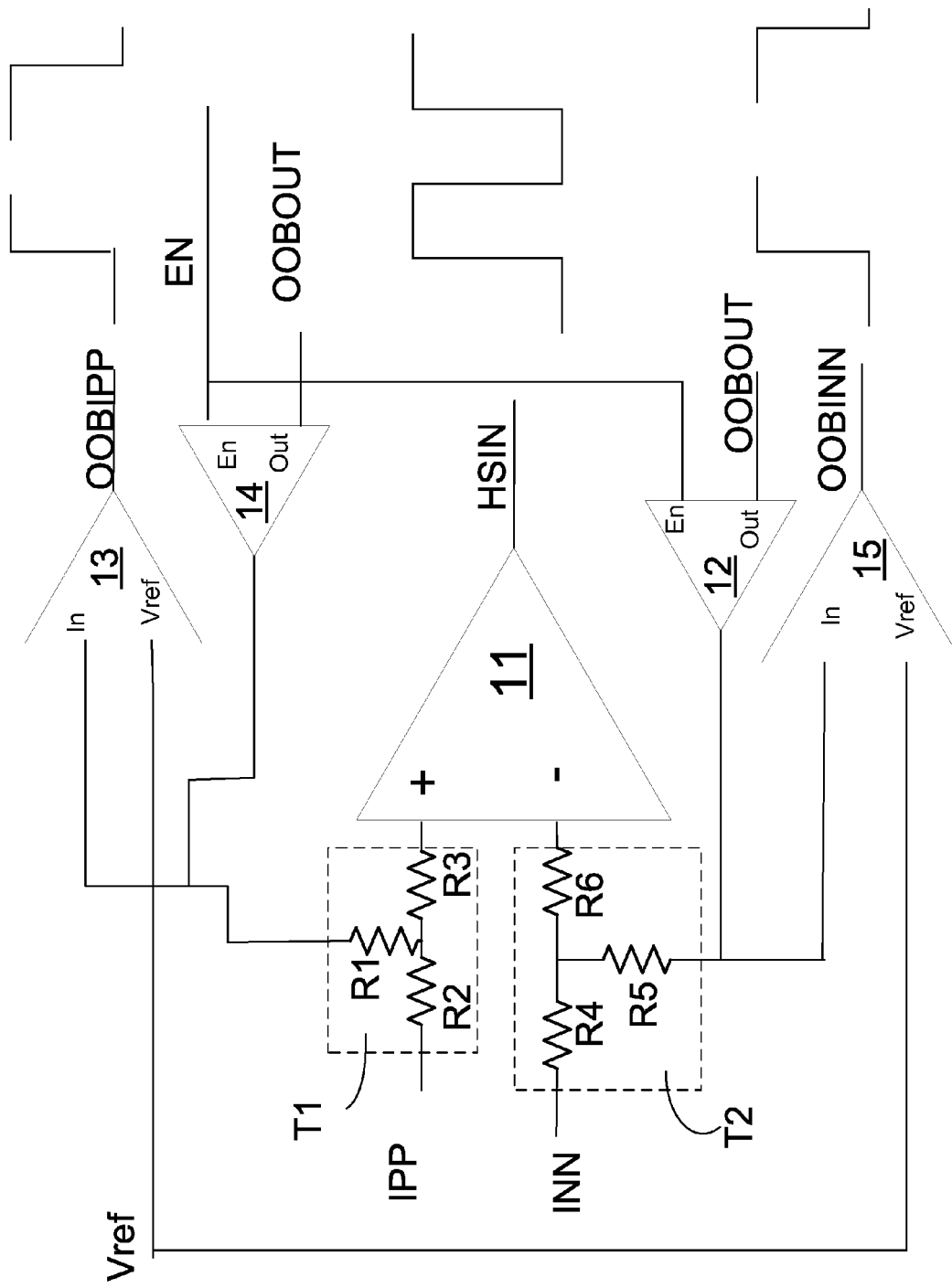
FIG. 5 illustrates a first embodiment of the present invention which is a MGT receiver including general purpose buffers and T networks for receiving and transmitting out of band signals.

Referring to FIG. 5, illustrated is a first exemplary embodiment of a circuit of the present invention. MGT receiver 11 is coupled to a differential pair of opposite polarity differential signals INN and IPP. The output of the receiver 11 is a time varying output HSIN that is positive when the differential voltage between INN and IPP is positive and negative when the differential voltage is negative, as shown. MGT receiver 11 is coupled with general purpose buffers 12, 13, 14 and 15 that can receive and transmit OOB signals.

General purpose input buffers 13 and 15 are coupled to input INN and IPP, respectively. These buffers are coupled to the inputs through the termination networks (T networks) T1 and T2. As shown in FIG. 5, each of the T networks includes, in this non-limiting example, three resistors. T1 includes resistors R1, R2, and R3, while T2 includes resistors R4, R6 and R5. General purpose output buffers 14 and 12 are coupled to output OOB signals to the differential signals INN and IPP through the T networks T1 and T2. When OOB signals are present on the signals INN and IPP, the signals in this particular exemplary embodiment are input/output signals; while in this exemplary embodiment the MGT signals are only received, so the MGT buffer 11 is only a receiver. In semiconductor fabrication, various methods for producing the resistors within T networks T1, T2 are known. For example, polysilicon resistors may be used.

The T networks T1 and T2 in the receiver circuit embodiment of FIG. 5 serve several important purposes. The T networks provide transmission line termination, which allows attenuation of the differential signals and a reduction of the common mode voltage. This is important to match the inputs of the MGT receiver 11 to the signal levels provided by the MGT signal transmitter (not shown) that provides the signals INN and IPP to the receiver 11. In the case where there is a common mode voltage mismatch, which may occur for example when devices provided by different vendors are coupled, or when supply voltages provided to the transmitting device and the receiver are different, the T networks provide a means for adjusting the common mode voltage. In one non-limiting example, the receiver 11 may be part of a first vendor's integrated circuit that is coupled to MGT transmitters on another vendor's integrated circuit. In this example, common mode voltage shifting is important to ensure proper high speed differential mode operation.

Another important function of the T network is that when the general purpose output buffers are enabled and can source OOB signals onto the differential signal pair, the differential pair of signals can be selectively terminated to either a positive voltage, when the output is driving a logical "1" signal, or to ground, when the output is driving a logical "0". (The correlation of a "1" to a high or Vcc supply voltage, and a "0" to a ground voltage, are arbitrary and may be reversed as is known in the art.) It is also important to allow the T-networks to operate properly with either Vcc or GND terminated MGT receivers when driving the high frequency differential signals on the MGT interfaces. In this way, the T networks may act to make circuitry with different termination voltages compatible so that they may communicate signals correctly. The T networks T1, T2 allow the use of the receiver 11 with both Vcc, and Vss, terminated transmitter devices during high speed MGT signaling.

Another important function of the T networks is that when the receiver buffers 13 and 15 are operating, the T networks provide a "tap point" for the extraction of the low speed OOB signaling data, without otherwise impeding or impairing the operation of the high speed signals. Note that the receivers 13 and 15 are general purpose input buffers designed to operate at lower frequencies than the receiver 11. When high frequency MGT signals are present on the MGT interface, the general purpose input buffers will not detect the higher frequency signal, due to the low pass filter nature of these general purpose buffers.

The reference voltage Vref in FIG. 5 should be selected to be a voltage level different from the common mode voltage. This is important so that the voltage shift (when the differential voltage is below the threshold set by the Vref inputs) during an OOB signaling event may be used to trigger the OOB data recovery by the general purpose input buffers 13 and 15. The voltage Vref determines the threshold voltage for the differential voltage between the two normally opposite polarity signals that indicates an OOB signal.

The waveforms depicted at the right of FIG. 5 depict typical recovered signals. The signal HSIN, for receiving high speed data input, is a time varying waveform that corresponds to the differential MGT signals received on the inputs. These signals are of relatively high frequency, the data rate on these signals may exceed 1 gigabit per second, for example. The signals may range up to 10 Gigabits per second presently, and even higher rates may be achieved in the future. The signals OOBINN and OOBIPP represent the OOB signals received by the general purpose input buffers. These OOB signals are of a frequency that is much lower than the differential signals, and may be below 500 kHz or even far less in frequency, as represented by the broken line in the waveforms. During OOB signaling on the MGT signal inputs INN and IPP, the two normally opposing polarity signals are placed at the same voltage, so that the two received signals OOBIPP and OOBINN should have the same voltage. This feature makes it possible to confirm that the signals are received correctly, and, that they are in fact OOB signals. The OOBOUT output signals to the buffers 12 and 14 will also be the same voltage levels, as the two OOB signals must be the same voltage on the differential interface signals INN and IPP to be correctly recognized and received by a receiver (not shown) coupled to these signals. In this manner, embodiments of the invention can detect OOB signals that are received, even when the OOB signaling protocol, is not known.

Figure 6:
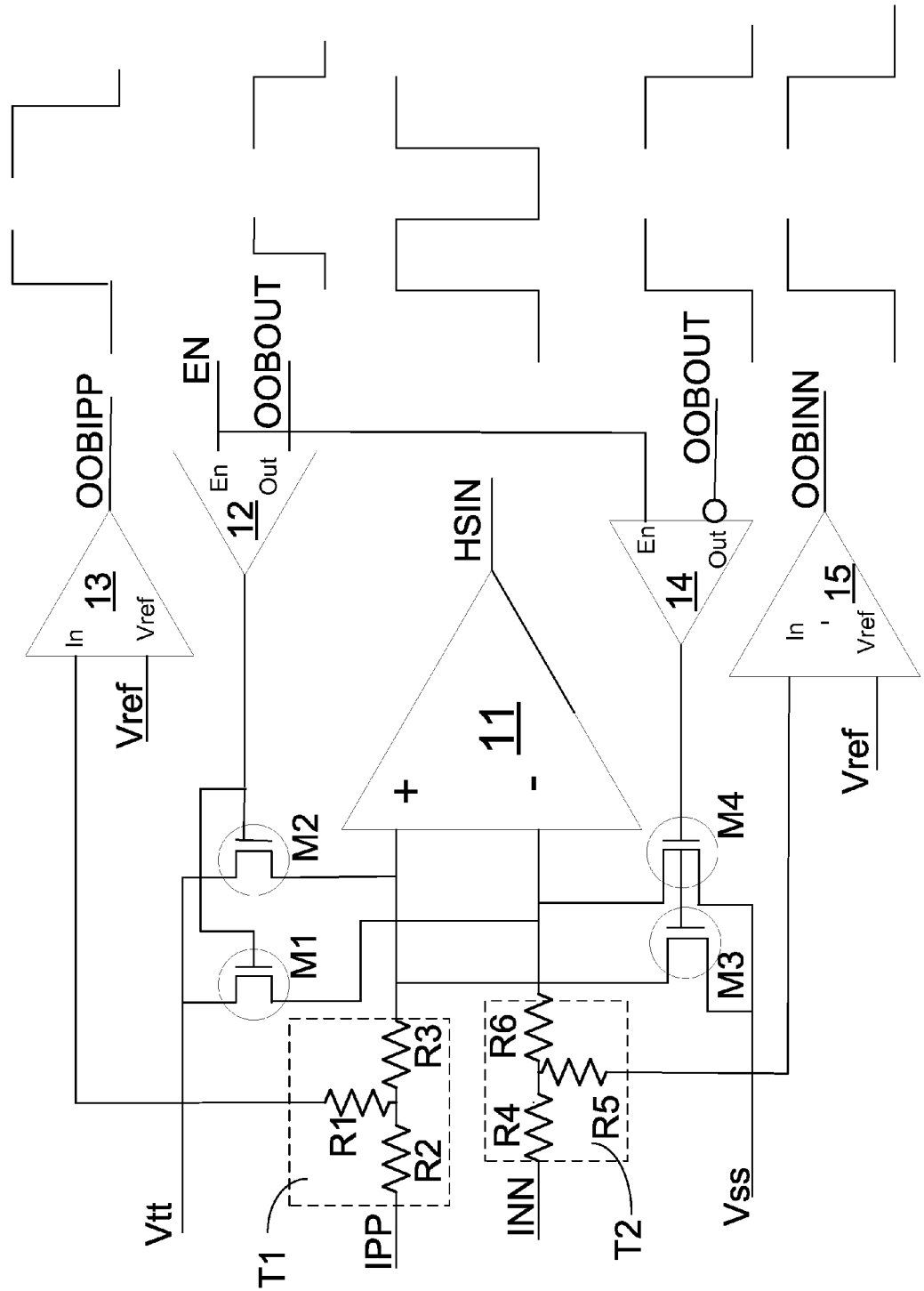
FIG. 6 illustrates a second embodiment of the present invention which is a MGT receiver including general purpose buffers and T networks with output drive transistors for receiving and transmitting out of band signals.

FIG. 6 depicts a circuit diagram for another exemplary MGT receiver circuit embodiment. In FIG. 6, MGT receiver 11 is coupled to a differential multiple gigabit signaling pair INN and IPP. In this embodiment, the transmitting device (not shown) may not be able to tri-state or disable its driving output buffer for the MGT signals to allow OOB signaling. This means that the general purpose output buffers 12 and 14 need to be able to overdrive any MGT signals that are present on the bus during OOB signaling periods. Transistors M1, M2, M3 and M4 are each coupled between the differential signals and a voltage supply. Transistors M1 and M2 are coupled to place a positive voltage on the differential bus, and transistors M3 and M4 are coupled to place a ground voltage on the differential bus. In this manner the output buffers 12 and 14 can control the voltages on the bus. The buffers 12 and 14 enable the appropriate transistors during OOB signaling by driving signals to the gates of the transistors. The transmission of OOB signals on the MGT pair is thus provided by controlling the gates of the transistors which are sized to overdrive any signals the transmitting device may provide. During normal MGT operation, these output buffers 12 and 14 are disabled using the enable signal EN and thus the transistors M1, M2, M3 and M4 do not interfere with normal operations. Preferably, due to the size requirements of the transistors M1, M2, M3 and M4, external transistors may be used; although it is also contemplated in other embodiments that these large transistors may be formed within an integrated circuit, along with the buffers.

The use of the transistors M1, M2, M3 and M4 to provide the high and ground voltages on the differential signals allows these voltages, Vtt for the high voltage in FIG. 6 and Vss for the ground voltage, to be different from the supply voltages to the general purpose output buffers 12 and 14. This feature provides another degree of design freedom by allowing additional adjustment to make the signal voltage levels compatible with the receiving device. The EN input to these output buffers allows them to be disabled for MGT differential signaling operations, and also when the circuit is acting as an OOB receiver. At those times OOB signals are received by input buffers 13 and 15.

In some applications, fewer components may be needed to provide the OOB circuitry with the MGT receiver. Alternative embodiments suitable for these applications are now described.

Figure 7:
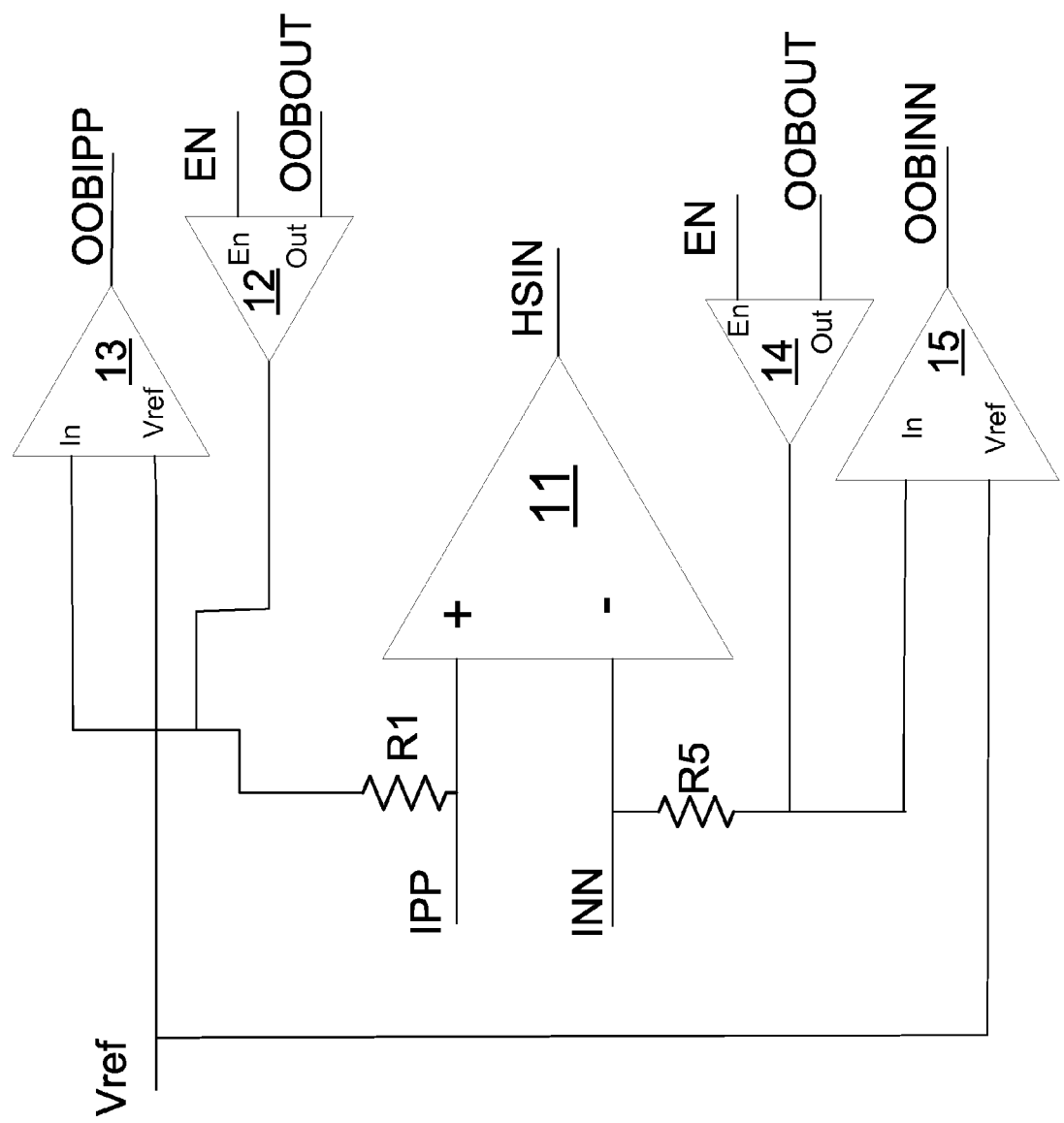
FIG. 7 illustrates a third embodiment of the present invention which is a MGT receiver including general purpose buffers and resistors for receiving and transmitting out of band signals.

In FIG. 7, another embodiment is illustrated. In this exemplary embodiment, the T networks T1 and T2 in a MGTS receiver with OOB signaling capability provided by general purpose buffers may be simplified. In this example, the transmitting device (not shown) and the receiver coupled to signals INN and IPP have the same common mode voltage. Thus, no common mode voltage adjustment is needed at the MGTS receiver 11 and some of the resistors may be eliminated. The remaining buffer 11, for MGT signal reception, and buffers 12, 13, 14 and 15 operate in the same manner as for FIG. 5. Resistors R1 and R5 provide a convenient termination to receive the OOB signals in receivers 13, 15 and also provide a terminal to supply OOB signals from the output buffers 12 and 14.

Figure 8:
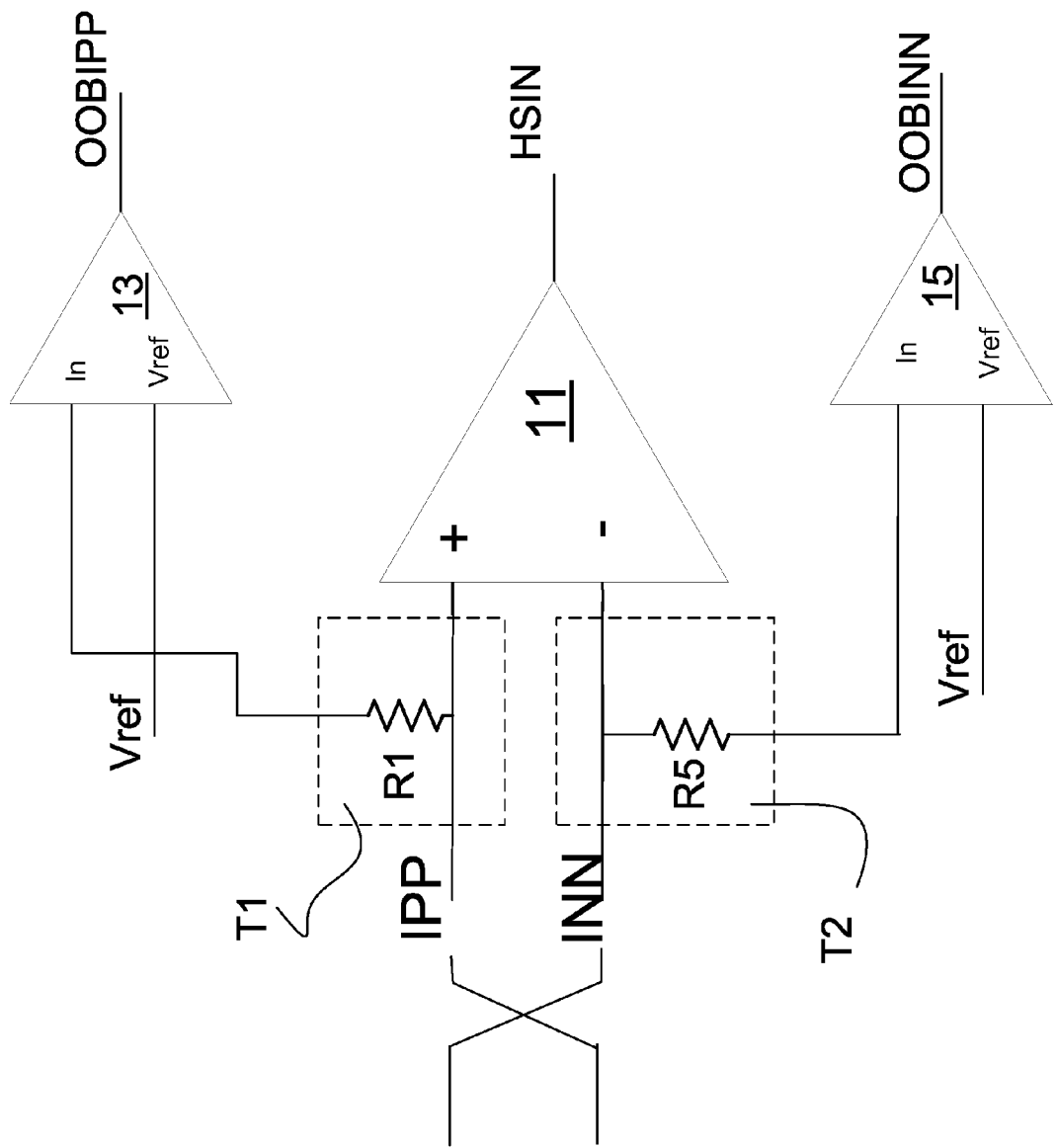
FIG. 8 illustrates an embodiment of the present invention which is a MGT receiver including general purpose buffers and resistors for receiving out of band signals.

FIG. 8 depicts another alternative embodiment where the OOB signals only need to be received by the receiver circuit. In this embodiment, the general purpose output buffers used to transmit or drive OOB in the above described embodiments may be eliminated. In this exemplary embodiment, the T networks T1 and T2 and the general purpose input buffers 13 and 15 receive the OOB signals from the differential signals INN and IPP when the transmitting device (not shown) transmits signals that are lower frequency than the general purpose input buffers pass frequency, and that have a differential voltage less than the threshold set by the reference Vref. When the higher frequency MGT differential signals are received, the general purpose buffers will not respond (due to the low pass frequency filter nature of these buffers) and the higher frequency MGT input buffer 11 will receive the differential signals.

Figure 9:
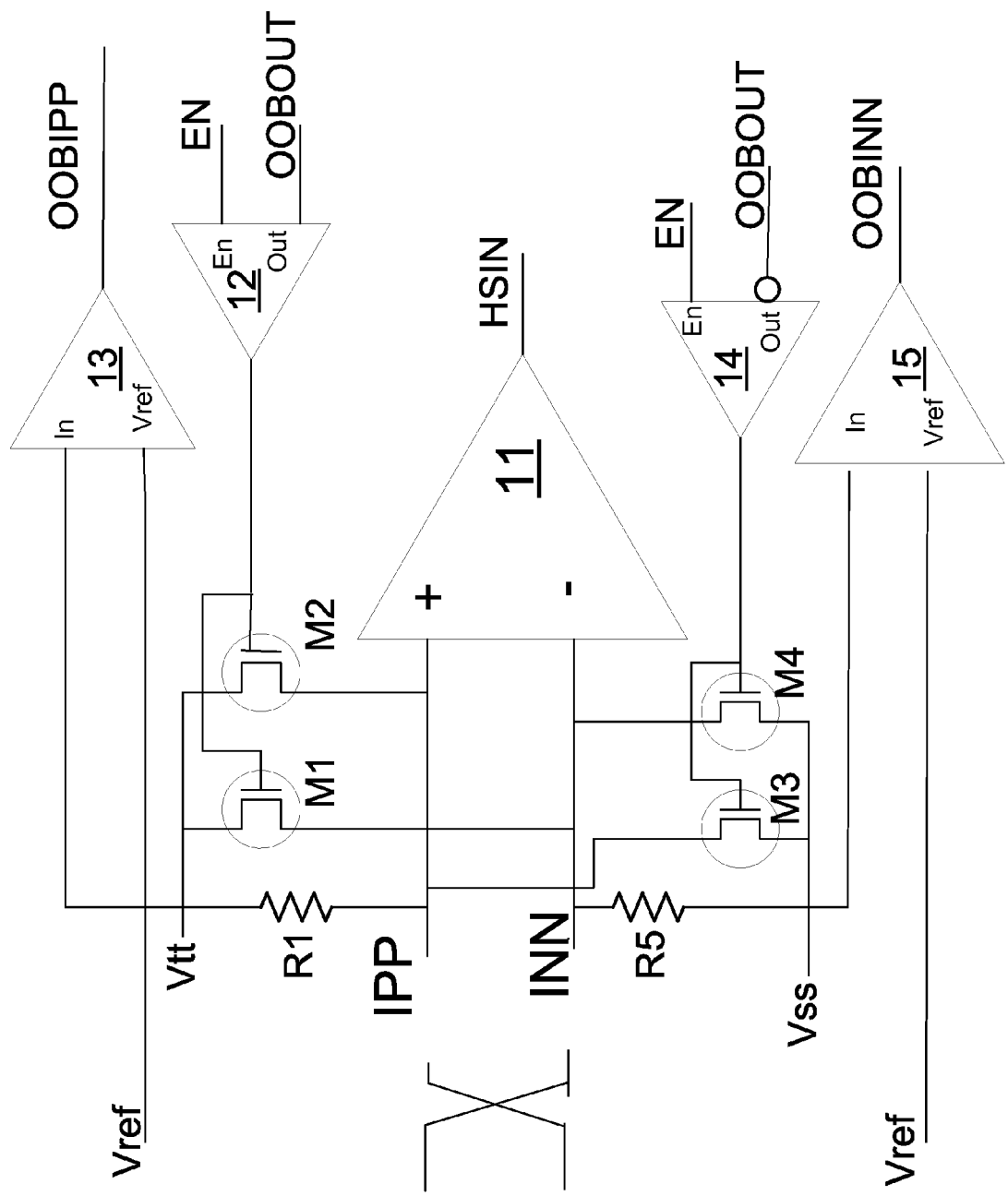
FIG. 9 illustrates another embodiment of the present invention, a MGT receiver including general purpose input and output buffers, output transistors and T networks for receiving and transmitting out of band signals.

FIG. 9 depicts an alternative embodiment of the receiving circuit of FIG. 8 which can receive and also transmit OOB signals, and receive MGT signals. In FIG. 9, the application is an example where the transmitter device (not shown and the receiver have the same common mode voltage, thus, the T networks T1 and T2 shown in the embodiments above may be eliminated, resistors R2, R3 and R4, R6 may be eliminated as the level shifting function is not needed. Otherwise, this circuit and the components buffer 11, general purpose input buffers 13 and 15 and the transmit or output buffers 12 and 14, along with the transistors M1, M2, M3 and M4 operate in the same manner as for the embodiments above.

Figure 10:
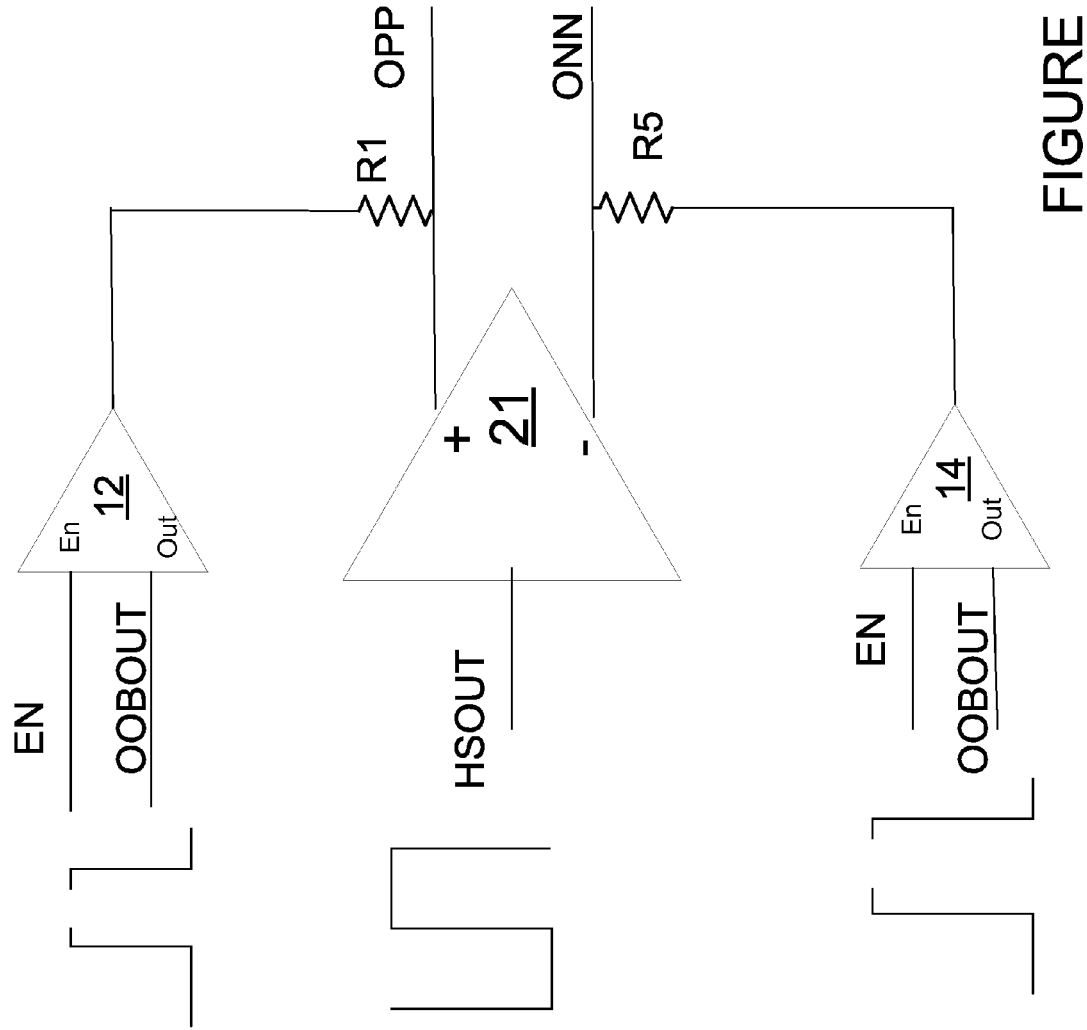
FIG. 10 illustrates another embodiment of the present invention, a MGT transmitter device including general purpose output buffers for transmitting out of band signals.

FIG. 10 depicts another exemplary embodiment. In FIG. 10, a MGT transmitter 21 has additional general purpose buffers 12 and 14 added to provide an OOB signal, and single resistors R1 and R5. In this embodiment, the common mode voltages of the transmitter 21 and the receiver (not shown) are matched so that the T networks shown above for embodiments with a common mode voltage shift are not needed.

In operation, the transmitter embodiment of FIG. 10 operates to transmit differential signals on outputs ONN and OPP responsive to the high speed data output HSOUT. If OOB signals are to be transmitted, the output buffers 12 and 14 are enabled and the data on signal OOBOUT is transmitted on the outputs ONN and OPP. Note that the two buffers 12 and 14 would be transmitting the same voltages on both ONN and OPP, indicating an OOB signal to the receiver (not shown) as the differential voltage between signals ONN and OPP would be less than a threshold voltage at the receiver. Resistors R1 and R5 provide a means for the output voltages to be adjusted when the OOB signals are transmitted. The enable signal EN is used to tri-state the outputs of the general purpose output buffers 12 and 14 when differential signaling is being performed, so that in the normal case, these general purpose output buffers do not interfere with the MGT differential signals.

Figure 11:
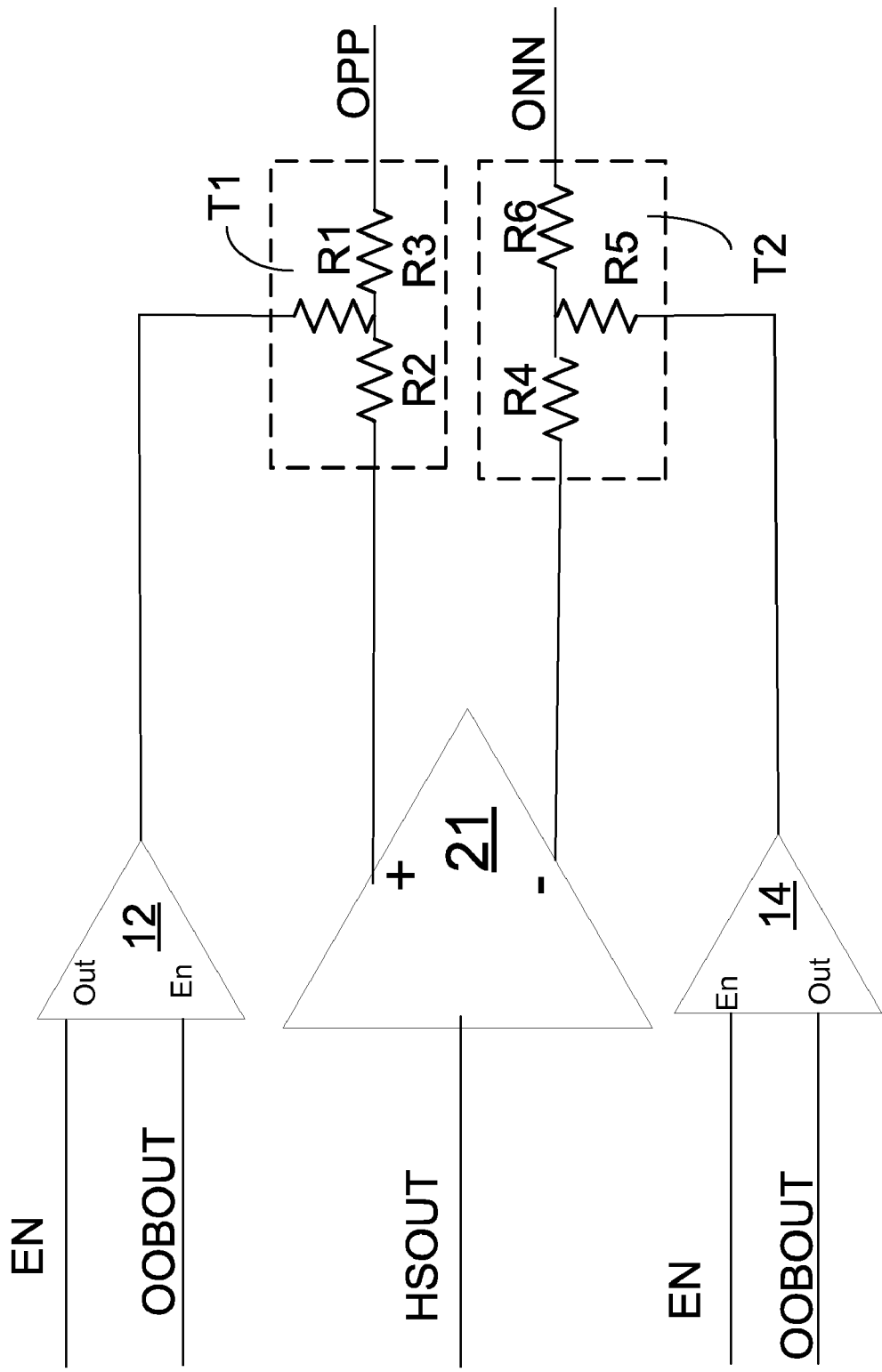
FIG. 11 illustrates yet another embodiment of the present invention, a MGT transmitter device including general purpose output buffers and T networks for transmitting out of band signals.

FIG. 11 depicts an alternative exemplary embodiment including an MGT transmitter 21 and further including OOB signal transmitters 12 and 14 with the T networks T1 and T2. In this embodiment, the common mode voltage can be adjusted to match the common mode voltage at the receiver (not shown) by using the general purpose output buffers. The circuit is a transmitter of both MGT signals and OOB signals. The enable signal EN coupled to the general purpose output buffers can tri-state or disable these buffers during normal MGT signaling operations, thereby preventing them from interfering with the high speed differential signaling from the MGT driver 21.

Figure 12:
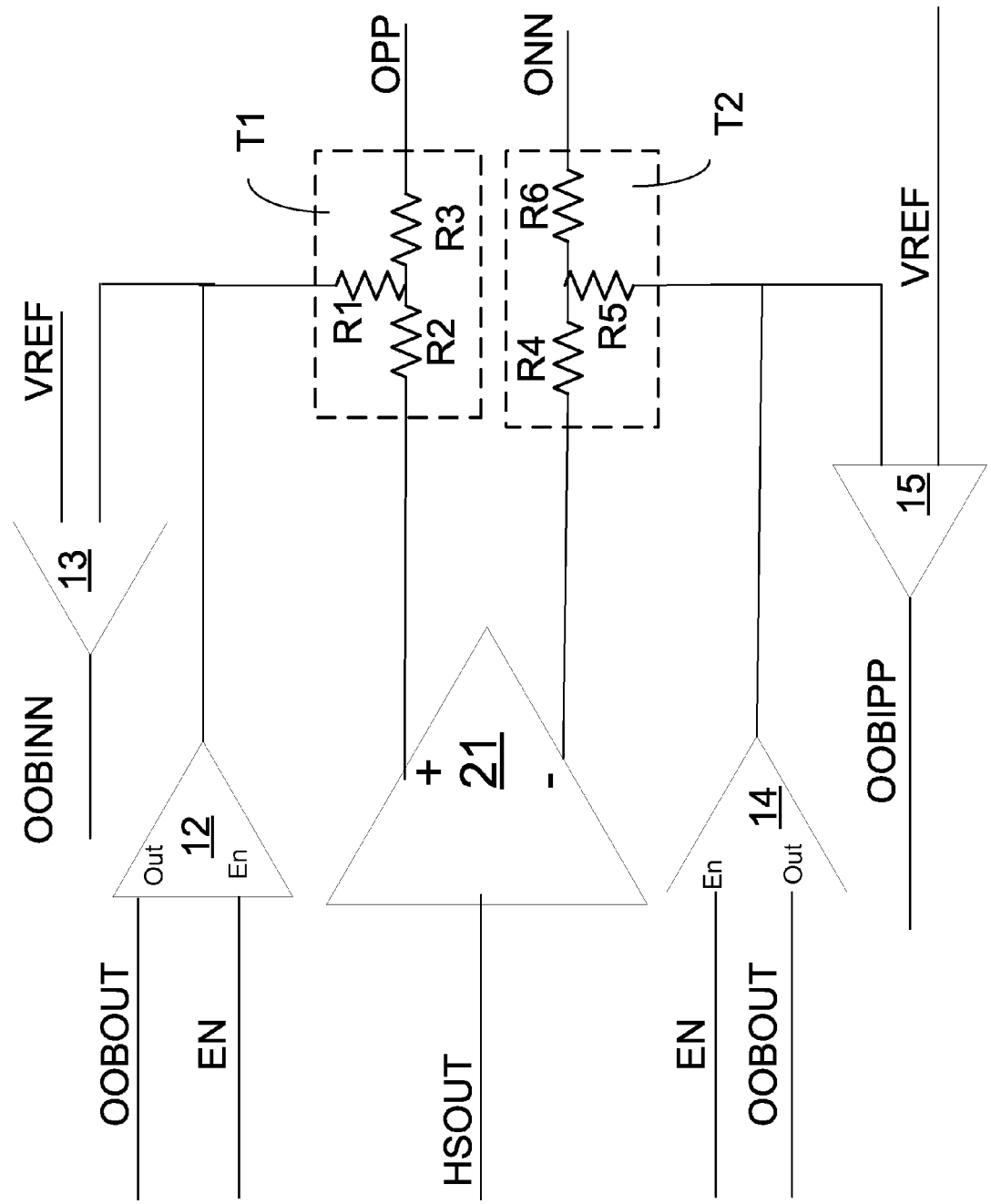
FIG. 12 illustrates yet another embodiment of the present invention, a MGT transmitter device including general purpose output buffers and T networks for transmitting and receiving out of band signals.

FIG. 12 depicts another circuit embodiment where an MGT output driver 21 is provided for driving the differential signals ONN and OPP, general purpose output buffers 12 and 14 are provided for driving OOB signals onto the differential outputs ONN and OPP, and general purpose input buffers 13 and 15 are provided for receiving OOB signals as inputs. The T networks T1 and T2 provide the same functions as in the above embodiments.

Figure 13:
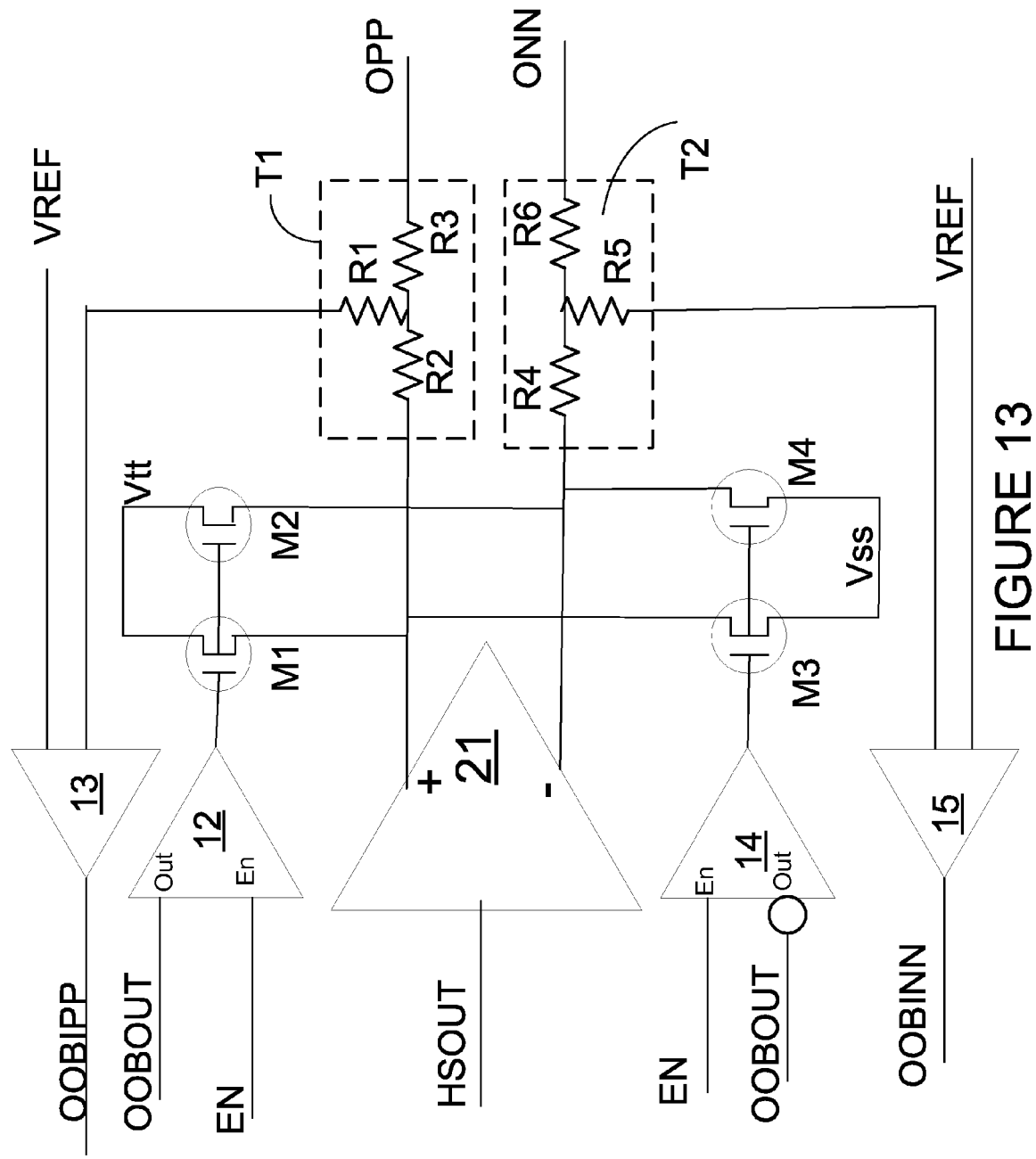
FIG. 13 illustrates yet another embodiment of the present invention, a MGT transmitter device including general purpose input and output buffers, T networks, and driving transistors for transmitting and receiving out of band signals.

FIG. 13 depicts an alternative embodiment of a transmitter that provides MGT differential signals for high speed serial communications on the differential signal pair ONN and OPP, and also provides OOB output signals using transistors M1, M2, M3 and M4. In this exemplary embodiment, the MGT transmitter 21 may not be able to disable or tri-state its output. In this example, to transmit the OOB signals, the general purpose buffers 12 and 14 need to be able to overdrive the differential signals that are present on the differential signals ONN and OPP. Accordingly, the transistors M1, M2, M3 and M4 should be sized sufficiently to drive the differential signals to a high voltage, or a low voltage, to transmit a logical "1" or a logical "0". The inverter at the input of buffer 14 is needed to provide the correct gating of the transistors M3 and M4 when the OOB signal should be low on both ONN and OPP. The enable signal EN allows the general purpose output drivers 12 and 14 to be disabled when not signaling OOB signals, so that these buffers do not interfere with the normal differential signaling operations.

The embodiment of FIG. 13 may be modified for applications where the T networks T1 and T2 are not required for the transmitter. In cases where the transmitter 21 and the receiver (not shown) are coupled to the differential signals ONN and OPP with the same common mode voltage, the circuit of FIG. 13 may be provided without resistors R2, R3, R4 and R6 of the T networks, as described in the above embodiments.

Embodiments of the present invention provide circuitry and methods for receiving and transmitting MGT signals, and for receiving and transmitting OOB signals on the MGT interface using general purpose buffers for receiving and transmitting the OOB signals. Advantageously, the circuits can be provided even when the OOB protocols are not yet known. Use of the embodiments provides a method to enable designers to complete a circuit that can receive OOB signals for future or as yet undefined OOB protocols, thereby lowering the costs for future systems and preventing the need for expensive redesigns.

The embodiments described above provide MGT receivers with OOB signal input and output buffers, and MGT transmitters with OOB signal input and output buffers. Combining the MGT receiver and MGT transmitters to form a MGT transceiver is another alternative embodiment contemplated as part of the invention and within the scope of the appended claims. The MGT transceiver may be arranged, as the receiver and transmitter embodiments described above, with the T networks where applicable, with the resistors R1 and R5 where applicable, and with the transistors M1, M2, M3 and M4 for providing high and low OOB signals, where applicable.

The embodiments may be provided as a stand alone circuit on a circuit board or within a system. More typically, the circuit embodiments described above may advantageously be implemented as input and output buffers on an integrated circuit. The use of these embodiments is particularly advantageous with a programmable or reprogrammable integrated circuit such as an FPGA. These integrated circuits can then be used with any OOB signal protocol by programming circuits to recognize the OOB signals that are received, or to form the OOB signals to be transmitted. There is no need to fabricate a new buffer circuit or redesign the integrated circuit. A programming step can complete or update the design, thereby "future proofing" the design process. The OOB signals provided by the embodiments above can be processed by programmable circuitry on the FPGA that can be altered to recognize the OOB protocols that eventually emerge.

The embodiments described above may also be provided as a stand alone integrated circuit. These alternative implementations are contemplated as additional embodiments of the present invention and are within the scope of the appended claims. Those skilled in the art will recognize that many obvious modifications to the exemplary embodiments may be made while still using the disclosed inventions. For example, some of the terms used in the foregoing and the appended claims are chosen with regard to the presently used terms in the relevant art and being used in draft standards presently in work. Changes in these terms and abbreviations over time by use in industry and in standard drafting are contemplated and do not change the scope of the inventions disclosed nor limit the scope of the appended claims. These modifications are contemplated as additional embodiments, are considered as within the scope of the invention and fall within the scope of the appended claims.

The invention claimed is:

1. An apparatus, comprising:
a differential signal interface for coupling a differential signal at a first frequency on a pair of opposite polarity signals;
a differential signal receiver coupled to the differential signal interface and outputting received data signals;
a first general purpose input buffer for receiving an out of band signal at a second frequency lower than the first frequency, coupled to a first one of the pair of opposite polarity signals, and having a first out of band signal output;
a second general purpose input buffer for receiving the out of band signal at the second frequency, coupled to a second one of the pair of opposite polarity signals, and having a second out of band signal output;
wherein the out of band signal is received on the differential signal interface having a differential voltage level on the pair of opposite polarity signals that is below a threshold voltage.

2. The apparatus of claim 1, further comprising:
a first resistor coupling the first general purpose input buffer to the first one of the pair of opposite polarity signals; and
a second resistor coupling the second general purpose input buffer to the second one of the pair of opposite polarity signals;
wherein the first and second resistors provide attenuation for the differential signal interface.

3. The apparatus of claim 1, further comprising:
a first termination network coupling the first one of the pair of opposite polarity signals to a first input of the differential signal receiver, and having a terminal for coupling the first general purpose input buffer to the first one of the pair of opposite polarity signals; and
a second termination network coupling the second one of the pair of opposite polarity signals to a second input of the differential signal receiver, and having a terminal for coupling the second general purpose input buffer to the second one of the pair of opposite polarity signals.

4. The apparatus of claim 3, wherein each of the first and second termination networks further comprises:
a first resistor coupled between the differential signal interface and a node;
a second resistor coupled between the terminal and the node; and
a third resistor coupled between the node and the respective input to the differential signal receiver.

5. The apparatus of claim 1, further comprising:
a first general purpose output buffer coupled to the first one of the pair of differential signals for transmitting the out of band signal at the second frequency; and
a second general purpose output buffer coupled to the second one of the pair of differential signals for transmitting the out of band signal at the second frequency.

6. The apparatus of claim 5, further comprising an enable signal coupled to each of the first and second general purpose output buffers.

7. The apparatus of claim 5, further comprising:
a first transistor and a second transistor coupled between a high voltage supply and each of the first and second differential signals, and having a gate terminal coupled to the output of the first general purpose output buffer; and
a third transistor and a fourth transistor coupled between a low voltage supply and each of the first and second differential signals, and having a gate terminal coupled to the output of the second general purpose output buffer.

8. The apparatus of claim 7, wherein:
the first and second transistors are operable to transmit a high out of band signal on the differential signal interface responsive to the first general purpose output buffer; and
the third and fourth transistors are operable to transmit a low out of band signal on the differential signal interface responsive to the second general purpose output buffer.

9. The apparatus of claim 4, further comprising:
a first general purpose output buffer coupled to the first one of the pair of differential signals for transmitting the out of band signal at the second frequency; and
a second general purpose output buffer coupled to the second one of the pair of differential signals for transmitting the out of band signal at the second frequency.

10. The apparatus of claim 9, further comprising an enable signal coupled to each of the first and second general purpose output buffers.

11. The apparatus of claim 10, further comprising:
a first transistor and a second transistor coupled between a high voltage and each of the first and second differential signals, and having a gate terminal coupled to the output of the first general purpose output buffer; and
a third transistor and a fourth transistor coupled between a low ground voltage and each of the first and second differential signals, and having a gate terminal coupled to the output of the second general purpose output buffer.

12. The apparatus of claim 1, further comprising:
a differential signal transmitter coupled to transmit opposite polarity differential signals on the differential signal interface at the first frequency, responsive to a transmit data signal.

13. The apparatus of claim 1, wherein the first frequency is greater than or equal to one Gigahertz.

14. The apparatus of claim 1, wherein the second frequency is less than or equal to 500 kilohertz.

15. An integrated circuit, comprising:
a plurality of configurable blocks coupled by configurable interconnect;
a plurality of storage elements storing user programmed configuration data for programming the configurable blocks and the configurable interconnect to perform a defined function;
a plurality of multiple gigabit receiver circuits for receiving differential data signals at a first frequency on pairs of opposite polarity differential signals; and
at least one of the multiple gigabit receiver circuits further comprising:
a first general purpose input buffer for receiving out of band signals at a second frequency lower than the first frequency, coupled to one of the pair of opposite polarity differential signals, and having a first out of band signal output; and
a second general purpose input buffer for receiving out of band signals at the second frequency, coupled to the other one of the pair of opposite polarity differential signals, and having a second out of band signal output;
wherein out of band signals are received having a differential voltage level between the pair of opposite polarity signals that is below a threshold voltage.

16. The integrated circuit of claim 15, wherein the at least one multiple gigabit receiver circuits further comprises:
a first resistor coupling the first general purpose input buffer to the first one of the pair of opposite polarity differential signals; and
a second resistor coupling the second general purpose input buffer to the second one of the pair of opposite polarity differential signals;
wherein the first and second resistors provide attenuation for the differential signal interface.

17. The integrated circuit of claim 15, further comprising:
first termination network coupling a first one of the pair of opposite polarity signals to an input of the differential signal receiver, and having a terminal for coupling the first general purpose input buffer to the first one of the pair of opposite polarity signals; and
a second termination network coupling a second one of the pair of opposite polarity signals to an input of the differential signal receiver and having a terminal for coupling the second general purpose input buffer to the second one of the pair of opposite polarity signals.

18. The integrated circuit of claim 17, wherein each of the first and second termination networks further comprises:
a first resistor coupled between the respective one of the pair of opposite polarity differential signals and a node;
a second resistor coupled between the terminal and the node; and
a third resistor coupled between the node and the respective input of the differential signal receiver.

19. A method for receiving out of band signals, comprising:
receiving a pair of opposite polarity differential signals at a first frequency on a multiple gigabit differential signal interface;
providing a first general purpose input buffer coupled to one of the pair of opposite polarity differential signals for receiving out of band signals at a second frequency lower than the first frequency, and having a first received out of band signal output;
providing a second general purpose input buffer coupled to the other one of the pair of opposite polarity differential signals for receiving out of band signals at the second frequency and having a second received out of band signal output; and
receiving out of band signals at the second frequency on the opposite polarity differential signals that have a differential voltage below a threshold.

20. The method of claim 19, further comprising:
providing a first termination network coupling a first one of the pair of opposite polarity differential signals to an input of a differential signal receiver and having a terminal for coupling the first general purpose input buffer to the first one of the pair of opposite polarity signals; and
providing a second termination network coupling a second one of the pair of opposite polarity signals to a second input of the differential signal receiver and having a terminal for coupling the second general purpose input buffer to the second one of the pair of opposite polarity signals.

* * * * *